Patented Nov. 27, 1945

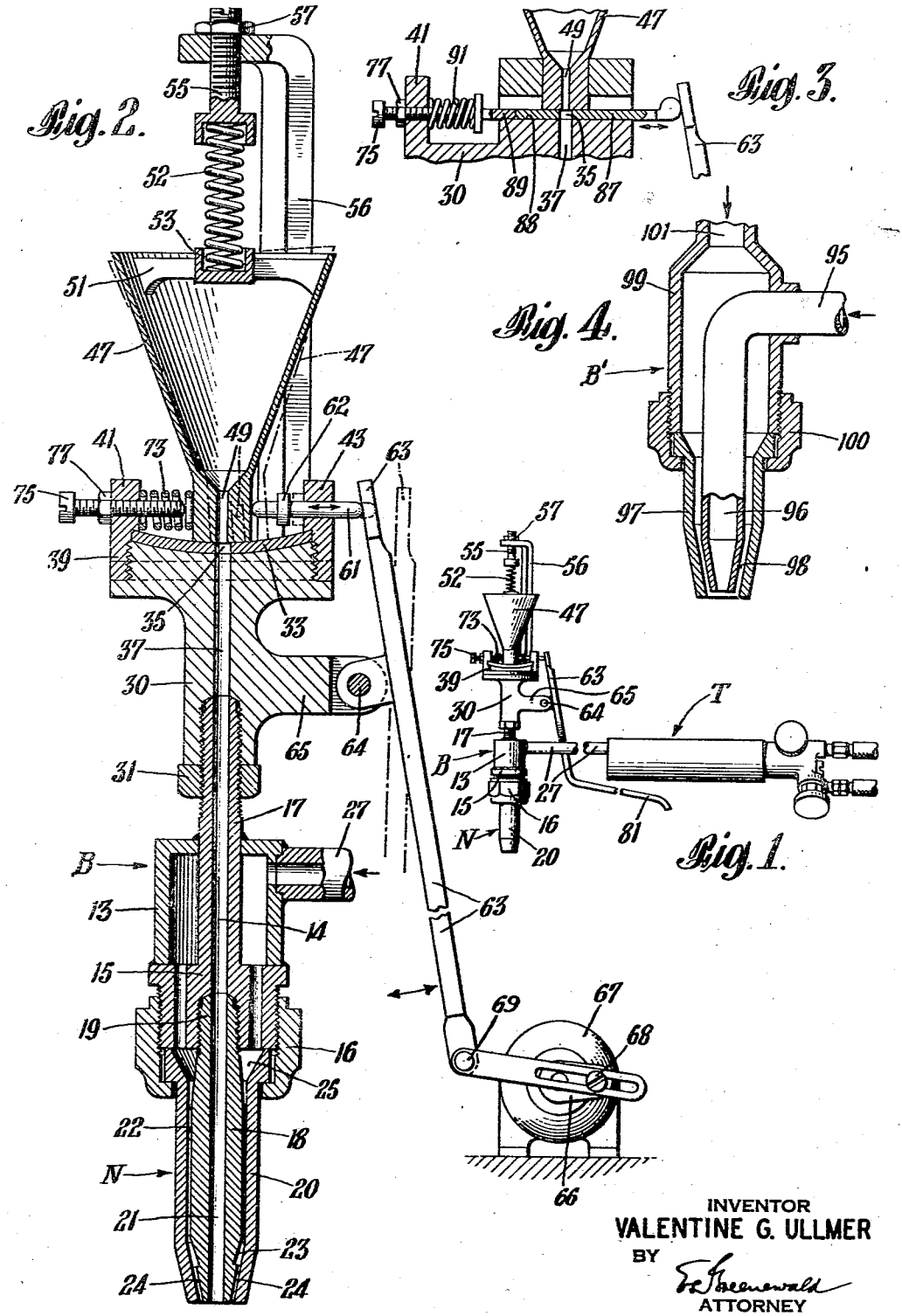

2,389,702

UNITED STATES PATENT OFFICE 2,389,702

APPARATUS FOR TREATING METAL ARTICLES

Valentine G. Ullmer, Pittsburgh, Pa., assignor to Haynes Stellite Company, a corporation of Indiana Application April 1, 1943, Serial No. 481,394

10 Claims. (Cl. 91—12.2)

This invention relates to the hard-surfacing of metal articles; and more especially it concerns an apparatus for providing a metal article with a welded-on surface coating or overlay of a wear-resistant and/or corrosion-resistant metal or alloy. The invention has especial utility in connection with an apparatus for coating or impregnating the surfaces of metal articles with particles of difficultly fusible diamond substitutes thoroughly bonded thereto. Among such compounds may be mentioned metallic carbides, borides, borosilicides, such as tungsten carbide and silicon carbide.

Processes already are known for providing the surface of a metal article with an overlay of a protective wear-resistant metal or alloy by heating the surface of the metal article by means of an oxy-fuel gas welding torch under conditions producing a substantial melting of the surface metal to a depth of generally around ⅛ inch, and simultaneously projecting against such molten surface metal, within the area against which the welding flame impinges, finely divided particles of the wear-resistant metal or alloy with sufficient impact to insure incorporation of the particles into the surface being treated. Such a process is disclosed in the United States Patent No. 2,173,484 of Robert L. Lerch and William A. Wissler.

The apparatus used in connection with such prior processes involved a welding torch having a plurality of spaced circumferentially arranged heating flame jets surrounding the discharge end of a central passage through which the particles of wear-resistant metal were fed by gravity onto the surface to be impregnated therewith. As shown in the aforesaid Patent No. 2,173,484, such a torch may have the central passage connected with a funnel or hopper for the overlay metal, supported on the torch head, from which the finely divided particles of facing metal are fed upon the work.

While the aforesaid means for supplying the hard-facing metal to the work has been satisfactory for the production of articles useful for certain operations, it has not proved suitable for use in many cases where a very uniform and constant flow of the hard-surfacing metal to the highly heated surfaces to be impregnated therewith is essential, as in the case of mechanized hard-facing operations.

Among the more important objects of the present invention are: to provide an apparatus for supplying a selected amount of a hard surfacing metal uniformly to work being surfaced thereby; and to provide in novel manner for the uniform continuous discharge of a selected quantity of a powdered wear- and corrosion-resistant metal or alloy to a metal surface to be treated therewith, while concurrently discharging upon such surface one or more streams of a welding gas, such as an oxy-fuel gas mixture, or the equivalent.

Referring to the accompanying drawing which illustrates certain preferred forms of the apparatus, Fig. 1 is a side elevation of one form of blowpipe and associated powdered metal-feeding mechanism of the invention, parts being broken away;

Fig. 2 is a transverse vertical section through a blowpipe head and associated powdered metal-feeding mechanism of modified design, parts being broken away;

Fig. 3 is a fragmentary sectional view of another form of a feed hopper and associated parts; and Fig. 4 is a view of another type of blowpipe head and nozzle, parts being broken away, and other parts being shown in section.

Referring to the drawing, the welding head B has a nozzle member N of well-known construction, connected with the torch head 13 by means of a tubular member 15 secured to the latter and a lock nut 16. The member 15 has a central passage 14, and an extension 17 of reduced cross-section which extends upwardly through and beyond a wall of member 13. The nozzle N is formed of an inner member 18, which has an extension 19 threadedly secured to member 15; and it has an outer member 20 suitably secured to the member 18 at and adjacent the discharge end of the nozzle. A shoulder on member 20 cooperates with a shoulder on lock nut 16 to secure the nozzle N to the member 15. The nozzle member 18 has a relatively large central passage 21 for finely divided surfacing metal provided with a discharge outlet, such passage being in axial alignment with a passage extending through the extension 17 of member 15. The members 18 and 20 are spaced apart throughout most of their lengths, and define therebetween an annular passage 22 with an enlarged lower portion 23. A plurality of inwardly and downwardly tapered, laterally-spaced gas discharge passages 24 lead from the latter to nozzle outlets surrounding the outlet of the central passage 21. The passages 24 are spaced equidistant from the central passage 21, and are respectively in communication with an annular passage 25 at the inlet end of the nozzle. The passage 25 is in communication with the discharge passage 27 of a welding torch T of well-known type through passages in members 13 and 15.

The torch has the usual valve-controlled fuel gas and oxygen connections, gas-mixing chamber, and control valve for the gas mixture, as shown in Fig. 1.

For feeding a uniform selected amount of finely divided overlay metal to and through the central passage 21 in the nozzle, there is provided, in the form shown in Fig. 2, a hopper-supporting member 30, threadedly secured to an externally-threaded end of the member 17, and locked in selected position with respect thereto by lock nut 31. Supported on the mid-portion of the upper surface of member 30 is a curved metal plate or strip 33 having a central aperture 35 in alignment with a passage 37 in the member 30, which passage is in axial alignment with the passage 21 in the blowpipe nozzle, and is in communication therewith. For securing the plate 33 upon member 30 with the passage therein in alignment with the passage 37, there is provided an annular locking member 39, threadedly secured to threaded outer margins at an upper portion of the member 30, as shown in Fig. 2. The ring 39 has upwardly extending ear portions 41, 43, at opposite sides thereof.

For supporting a quantity of finely divided hard-surfacing material for delivery to the torch nozzle N, there is provided a funnel-shaped hopper 47 having its discharge end adapted to rest upon the apertured plate 33 for free lateral sliding movement thereon. The hopper interior is in periodic, recurring communication with the aperture 35 in plate 33 through the passage 49 as a result of successive oscillatory or reciprocational lateral movements of the hopper relative to the plate. Proper support and alignment of the hopper 47 and associated parts during lateral movement of the hopper is secured by means of a spider 51 suitably secured to the hopper 47. The discharge end of the hopper 47 is maintained at all times in contact with the plate 33 by means of a spring 52 operatively interposed between a spring well 53 on spider 51 and a spring well on an adjusting screw 55 adjustably mounted in a threaded passage in an end of bracket 56 which is supported on member 30. Adjusting screw 55 may be locked in selected position by means of lock nut 57.

For reciprocating or oscillating the lower end of the hopper 47 back and forth across the curved plate 33 to bring the passages 35 and 49 recurrently in communication, to facilitate the intermittent discharge of material from the hopper through the aligned central passages 49, 35, 37, 14 and 21, there is provided a pin 61 freely slideable axially in an aperture in the ear 43. A shoulder 62 on pin 61 limits the movement of the latter in one direction. One end of pin 61 contacts the lower end of the hopper 47. The other end of the pin contacts one end of a lever 63 pivotally mounted on a pin 64 carried on an ear 65 formed on the member 30.

In the form of the invention shown in Fig. 2, the opposite end of the lever 63 is pivotally secured upon a link member 69 that is interconnected with a crank 66, secured to the shaft of a universal motor 67 of well-known type, by means of a crank pin 68, rotatably mounted in a bearing (not shown) adapted to be secured in any selected position within a slot formed in the member 69. The motor may be driven from a suitable source of power (not shown); and it may be mounted upon the blowpipe, or may be integral therewith, if desired. If manual operation is desired, the lever 63 may be provided with a trigger like that designated 81 in Fig. 1.

For maintaining the pin 61 in contact with the lever 63 at all times during movement of the latter in a direction away from the pin, a compression spring 73 is supported and operatively interposed between the lower end of the hopper 47 and an inner wall of the member 41. (See Fig. 2.) For limiting the movement to the left of the hopper along the plate 33 under action of the pin 61 and lever 63, there is provided a limiting screw 75 adjustably mounted in the member 41 and adapted to be locked in selected position by a lock nut 77.

The torch T, and the trigger, electric motor or equivalent mechanism for oscillating or reciprocating the hopper and for controlling the feed of solid overlay material to the torch nozzle and work, may be mounted on a common support. This is particularly desirable where the apparatus assembly is held stationary, and the work is moved past the nozzle. If desired, the lever 63 may be operated manually. An apparatus arrangement facilitating manual operation is illustrated in Fig. 1. In that figure the end of lever 63 has a curved trigger 81 adapted to be reached by the finger of the operator holding the torch T, the hopper then being reciprocated or oscillated along the plate 33 as a result of intermittent pressure applied to the trigger 81, and action of the spring 73.

If desired, a flat orifice plate may be employed in place of the curved plate shown in Fig. 2. Likewise, if desired, the hopper may be stationary, and the plate may be movable. Such an apparatus arrangement is shown in Fig. 3, wherein the plate is designated 87. The plate 87 freely rests for longitudinal sliding movement back and forth within a transverse passage 88 in the upper end of the hopper-supporting member 30. A knurled end of the plate is adapted freely to contact a free end of lever 63. The opposite end of the plate 87 has an abutment 89 adapted to limit the movement of the plate in a direction toward the right in Fig. 3. A compression spring 91 is supported and operatively interposed between the abutment 89 and a member similar to 41 secured to the member 30 of Fig. 2. Other elements of the structure of this modification of the invention shown in Fig. 3 may be similar to those shown in Fig. 2.

In the practice of the process using the apparatus shown in Fig. 2, the hard-surfacing metal or alloy, preferably in powdered or other finely divided form, is introduced into the cone-shaped hopper 47. After the gas mixture issuing from the oxy-fuel gas ports 24 of the nozzle has been ignited, the torch nozzle is brought into proper relation with respect to the work to be surfaced, and the motor 67 is actuated, thereby causing the hopper 47 to oscillate back and forth along the upper surface of the plate 33, under the action of motor 67 and spring 73. Each time that the discharge passage in the hopper comes in axial alignment with the passage 35 in plate 33 a small amount of the surfacing metal flows through the latter and thence through passage 21 to the nozzle discharge orifice and to the work while, concurrently, the flames from the encircling oxy-fuel gas jets 24 are directed upon the work. During this operation, the spring support 56 and associated parts assist in maintaining a fixed center of oscillation of the hopper. The passages 35, 37, and 21 preferably are of greater diameter than the passage 49 within the lower end of the hopper 39 to insure against flow stoppage due to clogging of the orifice plate by the finely divided metal.

By adjustment of screw 75, and/or adjustment of link 69 and pin 68, the distance through which the hopper may be moved under action of the motor 67 is readily controlled. In instances where the trigger 81 is substituted for the motor 67 and associated parts, the operation of the trigger is readily controlled manually to regulate the feed of solid materials. Thus, the apparatus is adjustable to feed to a hard-surfacing zone finely divided metals and alloys having a wide range in particle size. One or more oxy-fuel gas flames are disposed adjacent the discharge end of the central passage 21 in the blowpipe nozzle; and it is generally desirable where two or more of these flames are employed, that such flames be disposed around the discharge end of passage 21, and that such flames converge, as shown in Fig. 2.

According to another modification of the invention, there may be substituted for the head B and nozzle N shown in Fig. 2 a head B' such as shown in Fig. 4, having a conduit 95 providing a passage for a combustible gas mixture flowing thereto from a welding torch T. The conduit 95 is surrounded at and adjacent its discharge end by a nozzle 97 spaced therefrom to define an annular passage 98 for finely divided surfacing material. The nozzle is removably secured, as by a clamp 100, with a tubular head 99 through one side of which the gas conduit 95 extends. The tubular head is connected with the passage 37 (see Fig. 2) by means of passage 101. The gas conduit 95 has an outlet end preferably disposed in axial alignment with nozzle 97 and having an orifice spaced rearwardly of the discharge end of the latter a distance which conveniently may be about .625 inch.

In operations using this type of nozzle, the jet of combustible gases flowing from passage 96 is directed into the path of the finely divided particles flowing through the annular space 98, as a result of which such particles are ejected upon the work by the action of the jet of gases. This arrangement assists in preventing any combustible gas mixture from flowing backward into the space within the tubular member 99 through which the solid particles pass.

In a representative operation using a nozzle of the type shown in Fig. 4, a section of annular steel was mounted by its centers in a lathe, the torch assembly was mounted on the tool post, and the lead screw set at a course, the distance between courses being 1 inch. The steel section was rotated at about 200 R. P. M., and the torch was lighted and directed upon the surface of the steel section until the latter reached a sweating temperature at which time the trigger 81 was operated, thereby discharging upon the work a flowing stream of tungsten carbide particles of a size ranging between 100- and 200-mesh during movement of the torch along the work. The resultant deposit was very satisfactory, being evenly distributed on the work and from 0.003 inch to 0.004 inch in thickness; and being intimately united with the work.

The process and apparatus of the invention are well adapted for the surfacing of articles of steel, "Monel metal," bronze and aluminum with tungsten carbide, silicon carbide. These wear-resistant and corrosion-resistant materials can be deposited uniformly and to any desired extent upon the surfaces being treated, such uniformity being maintained during the treatment of successive articles of similar type.

By substituting for the perforated plate 33, other similar plates having therein passages 35 of greater or lesser diameter, controlled variations in the rate of feed of the surfacing material to the blowpipe nozzle and work are readily secured, thereby avoiding the necessity for using the usual type of valves normally subject to clogging by solid particles. The plates 33 are readily removable in obvious manner.

Such a control has not heretofore been possible in connection with mechanized hard-surfacing operations in a simple, readily controlled manner, as is here made possible. The hard-surfacing blowpipe and associated feeding mechanism of the invention is especially adapted for carrying out the process described in the aforesaid United States Patent No. 2,173,484, although obviously its utility is in no wise limited to use with such process.

It will be obvious to persons skilled in the art that many modifications of the design herein-described, and in the particular manner of effecting the uniform supply of finely divided surfacing materials to work to be surfaced thereby, may be made without substantially departing from the spirit of the invention as hereinde-scribed. Thus, for example, as illustrated in Fig. 3, the hopper 47 may be stationary, and the apertured plate 87 may be movable, in contradistinction to the form of the invention shown in Fig. 2. A wide variety of types of supports for the blowpipe and associated parts may be provided; and such supporting structures may be in the form of common supports for the blowpipe and the operating mechanism, or the supports may be independent of each other. Moreover, the supporting mechanism may be provided with means for universal adjustment in each or all of three planes.

The invention is susceptible of modification within the scope of the appended claims.

What is claimed is:

1. Apparatus for applying welded-on overlays of protective metal upon a metal surface, which comprises a blowpipe having a nozzle provided with a passage for finely divided solid material terminating in a discharge outlet; at least one passage for an oxy-fuel gas mixture having a discharge outlet; means for feeding a combustible gas mixture to such oxy-fuel gas passage; means for feeding a finely divided solid material to the first-named passage and the discharge outlet thereof, such solid material feeding means including a support for the finely divided material, said support having a discharge passage for such material, and an apertured plate, said support and plate being movable relative to each other; and means for effecting relative movement between said support and said plate transversely of said discharge passage, whereby intermittently and recurrently the aperture in the plate and the outlet passage in said support are both in communication with the passage for solid materials in the blowpipe nozzle.

2. Apparatus for applying welded-on overlays of protective metal upon a metal surface, which comprises a blowpipe having a nozzle provided with an annular passage for finely divided solid material terminating in a discharge outlet; at least one passage for an oxy-fuel gas mixture having a discharge outlet, and adapted to withdraw said solid material from said passage and discharge it from the nozzle within the gas stream; means for feeding a finely divided solid material to the first-named passage and the discharge outlet thereof, such solid material feeding means including a support for the finely divided material, said support having a discharge passage for such material, and an apertured plate, said support and plate being movable relative to each other; and means for effecting relative movement between said support and said plate transversely of said discharge passage, whereby intermittently and recurrently the aperture in the plate and the outlet passage in said support are both in communication with the passage for solid materials in the blowpipe nozzle.

3. Apparatus for applying welded-on overlays of protective metal upon a metal surface, which comprises a blowpipe having a nozzle provided with a passage for finely divided solid material terminating in a discharge outlet; at least one passage for an oxy-fuel gas mixture having a discharge outlet; means for feeding a combustible gas mixture to such oxy-fuel gas passage; means for feeding a finely divided solid material to the first-named passage and the discharge outlet thereof, such solid material feeding means including a hopper having a discharge outlet for finely divided material and an apertured plate, said hopper and plate being movable relative to each other; and means for effecting relative movement between the hopper and plate, whereby intermittently and recurrently the aperture in the plate and the hopper outlet are both in communication with the passage for solid materials in the blowpipe nozzle.

4. A hard-facing blowpipe comprising a body and a blowpipe nozzle, said nozzle having therein at least one discharge passage for an oxy-fuel gas mixture, and a discharge passage for a finely divided solid material having an outlet; a hopper for such solid material provided with a discharge outlet; and means for effecting recurrent relative movement between said hopper discharge outlet and said nozzle discharge passage for solid material, thereby intermittently and recurrently establishing free communication between said hopper outlet and the passage for solid material in the blowpipe nozzle.

5. Apparatus as defined in claim 4 having an apertured plate operatively interposed between the discharge outlet of the hopper and the solid materials discharge passage in the blowpipe nozzle, and means for reciprocating the hopper back and forth on said plate along a selected path of fixed length.

6. Apparatus for applying a welded-on overlay of protective metal upon a metal surface, which comprises a blowpipe having a nozzle provided with a passage for finely divided solid material terminating in a discharge outlet; at least one passage for an oxy-fuel gas mixture having a discharge outlet; means for feeding a combustible gas mixture to such oxy-fuel gas passage; means for feeding a finely divided solid material to the first-named passage and the discharge outlet thereof, such solid material feeding means including a hopper having a discharge outlet for finely divided material and an apertured plate, said hopper and plate being movable relative to each other; and means for effecting relative reciprocatory movement between said hopper and said plate, whereby intermittently and recurrently the aperture in the plate and the hopper outlet are both in communication for a brief period with the passage for solid materials in the blowpipe nozzle.

7. Apparatus for applying welded-on overlays of protective metal upon a metal surface, which comprises a blowpipe support; a blowpipe having a blowpipe nozzle secured to said support, said nozzle having a passage for finely divided solid metal terminating in a discharge outlet, and having at least one passage for an oxy-fuel gas mixture having a discharge outlet; means carried by said support for feeding a finely divided solid metal to the first-named passage, such feeding means including a hopper having a discharge outlet for finely divided metal and an apertured plate; said hopper and said plate being movable relative to each other; and means for effecting such relative movement of said hopper and said plate, whereby intermittently and recurrently communication is established between the aperture in the plate, the hopper outlet, and the passage for finely divided metal in the blowpipe nozzle.

8. Apparatus for applying welded-on overlays of protective metal upon a surface of a metal article, which comprises blowpipe means for melting to an appreciable depth successive portions of the surface of a metal article; and means operatively connected with said blowpipe means for simultaneously and recurrently feeding a supply of finely divided surfacing metal at a selected rate, by gravity upon the molten surface of the article.

9. Apparatus for forming welded-on overlays of protective metal upon a surface of a metal article, which comprises a blowpipe having a nozzle provided with a passage for finely divided surfacing metal, said passage having a discharge outlet; means for directing at least one oxy-fuel gas flame upon the said finely divided metal and the article as the former is discharged from said passage; mechanism for feeding a stream of such finely divided metal to said passage, said mechanism and blowpipe nozzle having a common support, and comprising an apertured orifice plate and a hopper mounted for reciprocational sliding movement upon said plate; means for reciprocating said hopper back and forth along said plate in a fixed path of selected length; and means for adjusting the length of the path of travel of said hopper along said plate.

10. Apparatus for forming welded-on overlays of protective metal upon a surface of a metal article, which comprises a blowpipe having a nozzle provided with a passage for finely divided surfacing metal, said passage having a discharge outlet; means for directing at least one oxy-fuel gas flame upon the said finely divided metal and the article as the former is discharged from said passage; mechanism for feeding a stream of such finely divided metal to said passage, said mechanism and blowpipe nozzle having a common support, and comprising a hopper and an apertured orifice plate mounted for reciprocational sliding movement relative to said hopper and support; means for moving said plate back and forth relative to the hopper along a fixed path of selected length; and means for adjusting the length of the path of travel of said plate.

VALENTINE G. ULLMER.